TOLERANCE COMPUTER

Filed April 21, 1969 2 Sheets-Sheet 1

INVENTORS
WILLIAM G. BARRETT
RICHARD C. ROWLAND
BY
ATTORNEYS

United States Patent Office 3,538,316
Patented Nov. 3, 1970

3,538,316
TOLERANCE COMPUTER

William G. Barrett and Richard C. Rowland, Bountiful, Utah, assignors, by mesne assignments, to the United States of America as represented by the Secretary of the Navy Filed Apr. 21, 1969, Ser. No. 817,944
Int. Cl. G05b *1/01;* G06f *7/02*
U.S. Cl. 235—177 10 Claims

ABSTRACT OF THE DISCLOSURE

A tolerance computer for ascertaining whether the difference between first and second serial binary numbers is no greater than a predetermined tolerance including a serial subtractor for obtaining the difference between the two binary numbers, a source for providing a tolerance number in serial binary form and a comparer in three embodiments for providing an output signal during the last bit time indicative that the first number is within the predetermined tolerance relative to the second number.

STATEMENT OF GOVERNMENT INTEREST

The invention described herein may be manufactured and used by or for the Government of the United States without the payment of any royalties thereon or therefor.

BACKGROUND OF THE INVENTION

The need often arises in processing data to ascertain whether or not an undetermined quantity or number represented by the first binary word is within a predetermined tolarance of a control quantity or number represented by a second binary word. A need has therefore arisen for a tolerance computer which can readily ascertain an in tolerance condition and yet operate with equal facility upon positive and negative numbers or combinations of positive and negative numbers wherein the requirement for storage of interim results is avoided and wherein the undetermined quantity may be greater or lesser than the control quantity.

SUMMARY OF THE INVENTION

The general purpose of this invention is to provide a tolerance computer which can process all combinations of positive and negative numbers without the necessity of storing interim results. Briefly, the general purpose of the invention is accomplished by providing a tolerance computer including a subtractor obtaining the difference between the undetermined and the control quantities and a comparer receiving the difference signal from the first subtractor and a tolerance quantity also in the form of a binary number which comparer includes logic circuitry for ascertaining whether or not an in tolerance condition exists. Still further, the invention contemplates that the comparer in one embodiment include a pair of serial binary subtractors for subtracting each of the tolerance quantity and the negative or two's complement form thereof from the difference quantity provided by the first serial binary subtractor and contemplates that the comparer include logic circuitry comparing the last bit of the output signals of the subtractor pair in the comparer indication when appropriate. Other embodiment of the comparer contemplate both the subtraction and the addition of the tolerance quantity and the difference quantity to provide a pair of output signals whose last bits are compared by the logic circuitry .

DESCRIPTION OF PREFERRED EMBODIMENT

Figures 1, 3:
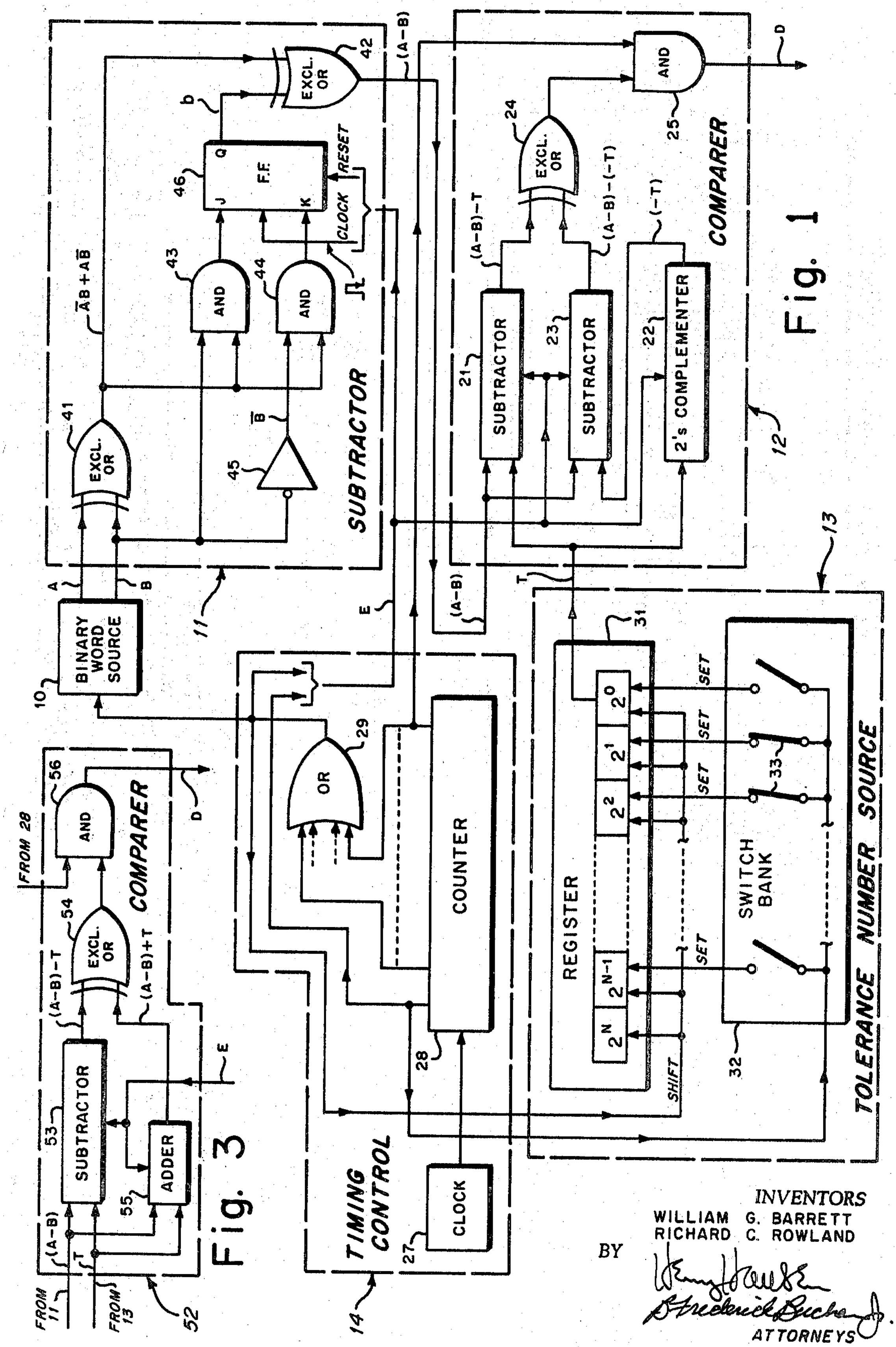
FIG. 1 represents a schematic and block diagram of the tolerance computer according to the invention.
FIG. 3 represents a schematic and block diagram of a modified embodiment of a comparer usable in the computer of FIG. 1.

In general, the unproven or undetermined quantity represented by a binary number A and the control quantity represented by a binary number B are provided by a binary word source 10 such as a storage device including shift registers having the words A and B stored therein. The words A and B are shifted out in serial form, the least significant digit first, to a serial binary subtractor 11. The last or most significant bit provided in each of the words A and B is a sign bit since the words A or B are presented in two's complement form if they represent negative numbers. The subtractor 11 provides a binary output signal $(A-B)$ indicative of the difference between the numbers represented by the words A and B. The difference will be in two's complement form if B is greater than A. The quantity $(A-B)$ is applied to a comparer 12 which is also connected to receive from a tolerance number source 13 a quantity of number T in serial binary form, least significant digit first, and representative of the desired degree of tolerance. The comparer 12 provides an output signal during the last or sign bit time which indicates whether the quantity A is within the desired degree of tolerance of the control quantity B. Since the quantities T and $(A-B)$ are presented to the comparter 12 in serial binary form, a timing control 14 is provided to synchronize the transfer of the quantities A and B to the subtractor 11, the transfer of the quantity T to the comparer 12, and the transfer of the serial difference quantity $(A-B)$ generated by the subtractor 11 to the comparer 12. The control 14 also provides a monitor signal to the comparer 12 during the last bit time to enable provision of the tolerance computer output signal D.

The invention may be further understood by the following example. Let it be assumed that the desired tolerance is $\pm 6$. Consequently, boundary values for the difference quantity $(A-B)$ are $\pm 7$ for an out of tolerance condition and $\pm 5$ for an in tolerance condition. Subtractions of the positive and negative tolerance quantities $+6$ and $-6$ from the positive difference quantity $(A-B)$ equals $+7$ yield respective $+1$ and $+13$. Similarly, subtractions of the positive and negative tolerance quantities $+6$ and $-6$ from the negative difference quantity $(A-B)$ equals $-7$ yield respectively $-13$ and $-1$. On the other hand, subtractions of the positive and negative tolerance quantities $+6$ and $-6$ from the positive difference quantity $+5$ yield respective $-1$ and $+11$ while subtractions of the positive and negative tolerance quantities $+6$ and $-6$ from the difference quantity −5 yield respectively −11 and +1. From the above, an out of tolerance condition exists when the signs of the differences resulting from the subtractions of positive and negative tolerance quantities from the difference quantity $(A-B)$ are the same. Conversely, an in tolerance condition exists when the signs for the differences resulting from the subtractions of the positive and negative tolerance quantities from the difference quantity $(A-B)$ are different.

Referring again to FIG. 1, the comparer 12 more particularly includes a serial binary subtractor 21 receiving both the difference and tolerance quantities $(A-B)$ and T and providing an output signal representative of the quantity $(A-B)-T$. The tolerance quantity T is applied to a conventional two's complementer 22 to obtain the tolerance quantity complement, representing a negative number, −T, which is applied to another serial binary subtractor 23 along with the difference quantity $(A-B)$. In effect, the complementer 22 subtracts each bit from ONE or inverts each of the bits in the word T to the opposite logical sense, i.e., ONE's are changed to ZERO's, etc., and a logical ONE is added to the least significant digit of the inverted word, all required carries being performed. The serial binary output signals of the subtractors 21 and 23 are applied to an EXCLUSIVE OR gate 14 whose output signal, in turn, is applied to one input of an AND gate 25. The AND gate 25 is pulsed or strobed by the timing control 14 during the last or sign bit time in order to monitor the output condition of the EXCLUSIVE OR gate 24 at a time when the in tolerance condition, if it exists is valid and in order to provide the tolerance computer output signal D.

It is contemplated that the timing control 14 may comprise a portion of a data processing system wherein the tolerance computer is utilized as one component. For example, the portion which controls the transfer of the binary quantities A and B by responding to packets of shift pulses associated with the words A and B may be used. For purposes of illustration, a suitable timing control can include, as shown in FIG. 1, a clock 27 which is activated to provide pulses to a counter 28 whose output stages successively in order to assume a logical ONE condition output to successively provide clock pulses E. The first clock pulse from the first stage of the counter 28 is applied to the subtractors 11, 21 and 23 to establish desired predetermined initial conditions of storage elements in logic circuits contained therein. The succeeding clock pulses E from the remaining stages of the counter 28 are applied through an OR gate 29 to the source 10 and to the subtractor 11 to enable their leading edges to cause a transfer of the words A and B. The clock pulses E are also applied to the tolerance number source 13 and the comparer 12 to transfer the bits of the tolerance quantity T in synchronization with the bits of the diference quantity $(A-B)$ to the comparer 12.

The tolerance number source 13 provides a serial binary number representing the tolerance quantity T, least significant digit first, to the comparer 12, the last bit being a logical ZERO indicating a positive number. A suitable source 13 may comprise, as shown in FIG 1, a shifter register 31 having a number of stages equal to the number of bits in the binary quantities A and B and which stages are connected to be shifted by the clock pulses from the counter 28 via the OR gate 29. The output clock pulse from the first stage of the counter 28 is applied through a switch bank 32 to set the stages of the register 31 in which logical ONE's are to be stored. For example, the switches 33 are closed to enable setting the second and third least significant stages of the register 31 to store the number $T=6$ in the binary form 000110 in the register 31. The output from the least significant stage of the register 31 is applied to the comparer 12 and will comprise the tolerance quantity T.

Although any serial binary substractor may be utilized as the subtractor 11, a suitable form includes an EXCLUSIVE OR gate 41 connected to receive the words A and B and providing an output signal representative of the quantity $\bar{A}B+A\bar{B}$ which is applied to one of the inputs of a second EXCLUSIVE OR gate 42 and also to the one of the inputs of each of the two AND gates 43 and 44. The quantity B is applied to the AND gate 43 and the quantity $\bar{B}$, generated by an inverter 25 connected to receive the quantity B, is applied to the AND gate 44. It is contemplated, of course, that the inverter 45 be eliminated where the EXCLUSIVE OR gate 41 is of the type wherein the signal $\bar{B}$ is available or where the source 10 provides $\bar{B}$. For example, the EXCLUSIVE OR gate may be of the type including at the input a pair of inverters for generating the quantities $\bar{A}$ nd $\bar{B}$ and a pair of AND gates connected respectively to receive the pairs of quantities A and $\bar{B}$ and $\bar{A}$ and B. The output signals of the AND gates 43 and 44 are applied respectively to the J and K inputs of a borrow digit storage, JK flip-flop 46 whose Q output signal, *b*, is applied to the EXCLUSIVE OR gate 42. The borrow flip-flop 46 is adapted to be toggled by the trailing edge of the clock pulses E which are received from the OR gate 29 so that the output signal of the EXCLUSIVE OR gate 42 representing the quantity $(A-B)$ is valid at least during the duration of each clock pulse. The flip-flop 46 is initially reset by the first clock pulse from the counter 28 in the timing control 14 so that the quantity *b* initially is a logical ZERO. The subtractor 11 functions in accordance with Truth Table I.

TRUTH TABLE I

| A | B | *b* | $(A-B)$ |
|---|---|---|---|
| 0 | 0 | 0 | 0 |
| 0 | 0 | 1 | 1 |
| 0 | 1 | 0→1 | 1→0 |
| 0 | 1 | 1 | 0 |
| 1 | 0 | 0 | 1 |
| 1 | 0 | 1→0 | 0→1 |
| 1 | 1 | 0 | 0 |
| 1 | 1 | 1 | 1 |

It is to be noted that when A is a ZERO and B, is a ONE, the AND gate 43 sets the flip-flop 46 when it is toggled by a clock pulse so that the quantity *b*, if previously a ZERO, is forced to become a logical ONE and the quantity $(A-B)$ is forced to become a logical ZERO. Similarly, when A is a ONE and B is a ZERO, *b* is forced to a ZERO condition changing the logical output from $A-B$ from ZERO to ONE where *b* was a ONE prior to toggling the flip-flop 46. In effect, the signals toggling the flip-flop 46, i.e., the trailing edges of the pulses E, lag in phase behind the signals applying or shifting the quantities A and B to the subtractor 11, i.e., the leading edges of the pulses.

Figure 2A:
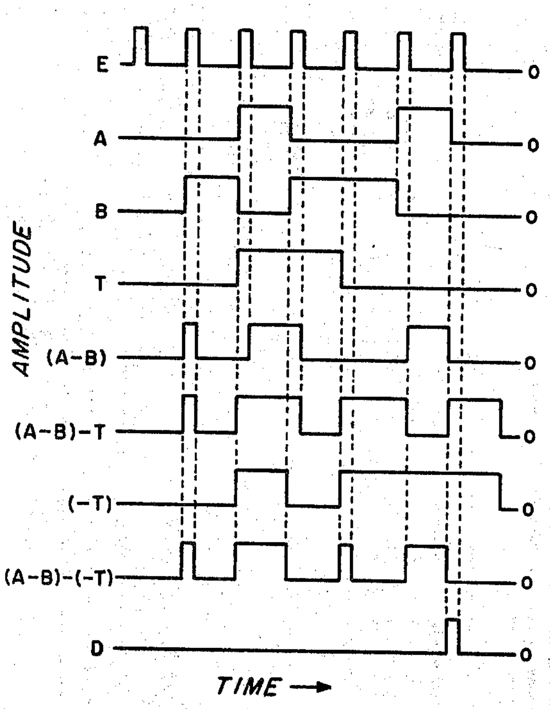
FIGS. 2*a* and 2*b* represent timing diagrams of various logic signals in the tolerance computer of FIG. 1 for both in tolerance and out of tolerance conditions.

The operation of the tolerance computer may be better understood by the following example of an in tolerance condition. Let it be assumed that the quantity A equals +18 represented by the binary word 010010, that the control quantity B equals +13 represented by the binary number 001101, and that the desired tolerance equals +6 represented by the binary number 000110. Referring to FIG. 2*a*, the clock 27 is actuated to provide the series of seven clock pulses to the counter 28. The first clock pulse from the counter 28 resets all the flip-flops such as 46 in the subtractors 11, 21 and 23. The next six clock pulses E from the counter 28 cause the words A and B to be serially applied to the subtractor 11 and the word T to be serially applied to the comparer 12. As the word T, e.g., 000110, is being applied to the comparer 12, the subtractor 11 begins to provide bit by bit the quantity $(A-B)$ which in the example changes from a ONE to a ZERO at the trailing edge of the second clock pulse since the output signal $b$ from the flip-flop 46 changes from ZERO to ONE when the flip-flop 46 is toggled. At the same time the subtractors 21 and 23 begin to provide their output signals $(A-B)-T$ and $(A-B)-(-T)$ as shown in FIG. 2*a*, the complementer 22 providing bit by bit the quantity $(-T)$, e.g., 111010. As the seventh clock pulse from the last stage of the counter 28 is applied to the AND gate 25, the EXCLUSIVE OR gate 24 is providing a logical ONE since $(A-B)-T$ is a ONE and $(A-B)-(-T)$ is a ZERO during that time. The AND gate 25 therefore provides a logical ONE during the last bit time coincident with the last clock pulse indicating that the quantity A is within the desired degree of tolerance relative to the control quantity B.

Figure 2B:
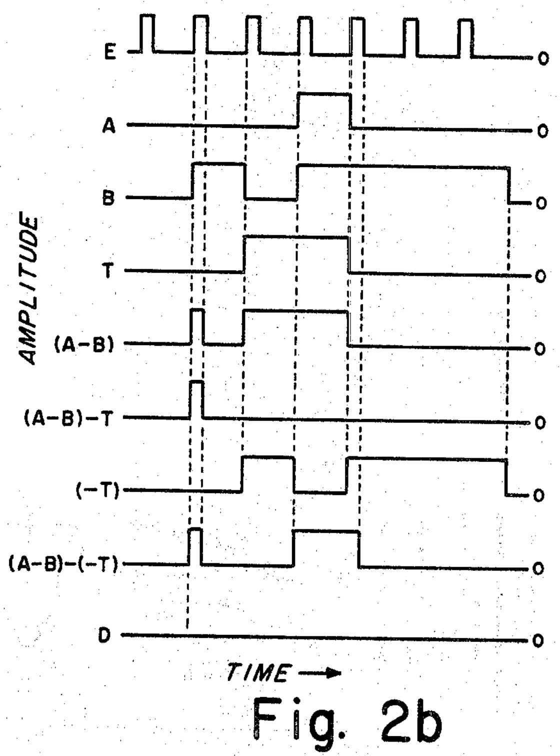

FIG. 2*b* discloses an example of an out of tolerance condition. Let it be assumed that the quantity A equals +4 represented by the binary number 000100, that the quantity B equals −3 represented by the binary number 111101, and that the tolerance quantity T equals +6 represented by the binary number 000110. As shown in FIG. 2*b*, the subtractors 11, 21, and 23 respectively provide in serial form, a least significant digit first, the quantities $(A-B)$, $(A-B)-T$, and $(A-B)-(-T)$. During the seventh clock pulse from the last stage of the counter 28, since the quantities $(A-B)-T$ and $(A-B)-(-T)$ are both the same, i.e., both a ZERO, the EXCLUSIVE OR gate 24 provides a ZERO output signal to the AND gate 25 whose output signal continally remains a ZERO indicating that the quantity A is out of tolerance relative to the quantity B.

Generally, where the difference quantity $(A-B)$ represents a positive number, i.e., the last or signal bit is a ZERO, the tolerance computer will indicate an out of tolerance condition where $(A-B)$ exactly equals T, T always being a positive number, unless doubling T will change its sign bit to a ONE. Conversely, where the difference quantity $(A-B)$ represents a negative number, i.e., the last or sign bit is a ONE, the tolerance computer will indicate an in tolerance condition where $(A-B)$ exactly equals T unless the last bit of $(A-B)-T$ is a ZERO.

Other embodiments of the comparer 12 are contemplated. For example, the modified comparer 52 of FIG. 3 includes a serial binary subtractor 53 connected to receive the quantity $(A-B)$ from the subtractor 11 and the quantity T from the source 13. The subtractor 53 provides the quantity $(A-B)-T$ to an EXCLUSIVE OR gate 54. The quantities $(A-B)$ and T are also applied to an adder 55 which supplies the quantity $(A-B)+T$ to the EXCLUSIVE OR gate 54. The output signal of the EXCLUSIVE OR gate 54 is applied to an AND gate 56 which is strobed by the seventh clock pulse from the last stage of the counter 28 in order to provide the output signal D indicating whether or not the quantity A is within the desired degree of tolerance of the quantity B. Since adding a first number to a second number is equivalent to subtracting the two's complement of the first number from the second number, the EXCLUSIVE OR gate 54 will provide the same output signal during the times coincident with the clock pulses E as the EXCUSIVE OR gate 24 of the comparer 12 of FIG. 1.

Figure 4:
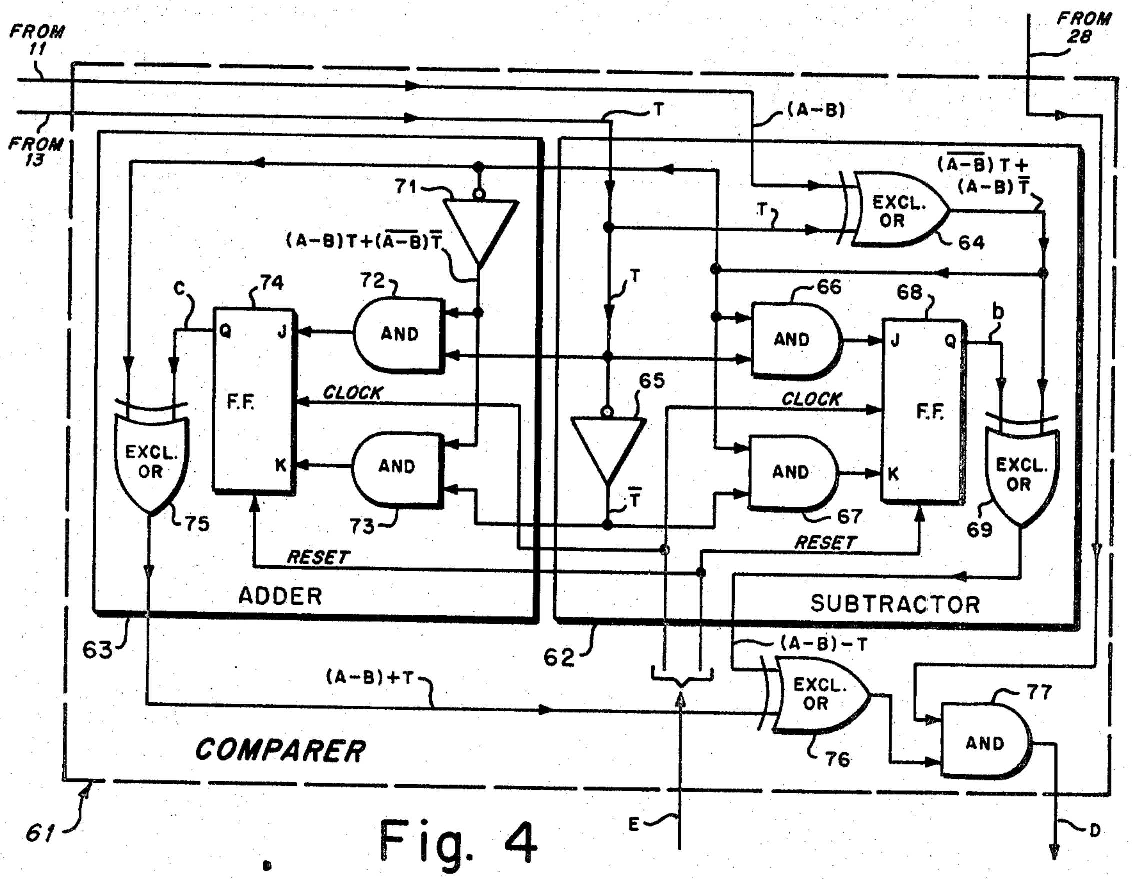
FIG. 4 represents a further modified embodiment of comparer usable in the computer of FIG. 1.

A further modified comparer 61 have a subtractor 62 and an adder 63 is disclosed in FIG. 4. The quantities $(A-B)$ and T are supplied to an EXCLUSIVE OR gate 64 of the subtractor 62 which is just like the subtractor 11 of FIG. 1 and includes an inverter 65, a pair of AND gates 66, 67, a borrow storage flip-flop 68 and another EXCLUSIVE OR gate 69. The output signal of the EXCLUSIVE OR gate 64 representing the quantity $(\overline{A-B})T+(A-B)\overline{T}$ is applied through an inverter 71 to each of a pair of AND gates 72 and 73 in the adder 63 having their other inputs connected respectively to receive the quantities $\overline{T}$ and $\overline{T}$ from the subtractor 62. Of course, the inverter 71 need not be used where the NOT form of the quantity $$(\overline{A-B})T+(A-B)\overline{T},\ \text{i.e.,}\ (A-B)T+(\overline{A-B})\overline{T}$$

is available directly from the EXCLUSIVE OR gate 64 which may be of the type having the outputs of its input AND gates connected together at a junction forming a hard wired OR gate in turn connected to an inverter providing the EXCLUSIVE OR gate output signal. The output signals of the AND gates 72 and 73 are applied respectively to the J and K inputs of a carry storage JK flip-flop 74 whose Q output signal designated $c$ is applied to an EXCLUSIVE OR gate 75 along with the quantity $(\overline{A-B})T+(A-B)\overline{T}$ from the EXCLUSIVE OR gate 64 of the subtractor 62. The output signals of the subtractor 62, i.e., $(A-B)-T$, and the EXCLUSIVE OR gate 75, i.e., $(A-B)+T$, of the adder 63 are applied to an EXCLUSIVE OR gate 76 whose output signal in turn is applied to one input of an AND gate 77 having its other input connected to receive the last clock pulse from the last stage of the counter 28. The carry flip-flop 74 functions upon being toggled by the trailing edge of the clock pulses received from the control 14 to store the appropriate carry digit in a manner similar to the borrow flip-flop 46 of the subtractor 11 except that the AND gates 72 and 73 provide ONE output signals to set or reset the flip-flop 74 when toggled only if the particular bits of the signals being received by the EXCLUSIVE OR gate 64 are the same, i.e., either both ONE's or both ZERO's. Considering the EXCLUSIVE OR gate 64 in the subtractor 62 as a part of the adder 63, the adder 63 functions in accordance with Truth Table II.

TRUTH TABLE II

| $(A-B)$ | T | $c$ | $(A-B)+T$ |
|---|---|---|---|
| 0 | 0 | 0 | 0 |
| 0 | 0 | 1→0 | 1→0 |
| 0 | 1 | 0 | 1 |
| 0 | 1 | 1 | 0 |
| 1 | 0 | 0 | 1 |
| 1 | 0 | 1 | 0 |
| 1 | 1 | 0→1 | 0→1 |
| 1 | 1 | 1 | 1 |

The AND gate 77 provides the tolerance computer output signal D which indicates whether or not the quantity A is within the desired degree of tolerance of the quantity B. The quantity $(A-B)+T$ in the comparer 61 will be the same as the quantity $(A-B)-(-T)$ in the comparer 12 during times of coincidence with the clock pulses from the counter 28. The operation of the comparer 61 is therefore substantially the same as the operation of the comparer 12, output signals of the subtractor 62 and the adder 63 changing condition should the carry or borrow flip-flops change condition when toggled.

It is contemplated, of course, that the tolerance number source 13 could also be located in the data processing system memory along with the binary word source 10 and that the quantity T could be supplied therefrom in two's complement form so that the two's complementer 22 in the comparer 12 could be eliminated. Use of the two's complement form of the quantity T is not required for the comparer embodiments of FIGS. 3 and 4.

The invention therefore provides a tolerance computer which can readily process the quantities A and B whether they represent positive or negative or combinations of positive and negative numbers. The tolerance computer provides an indication during the first portion of the last or sign bit time as to whether or not the quantity A is within the desired degree of tolerance of the quantity B. Use of the disclosed configurations for the subtractor such as 11 of FIG. 1 provides a ONE in tolerance signal D having a duration equal to the duration of the clock pulses which may be used to further control processing of the quantity A by the data processing system with which the tolerance computer of the invention is used. The disclosed tolerance computer may be readily fabricated from discrete components and also may be fabricated utilizing integrated circuit techniques. The in or out of tolerance condition is simply determined and presented in its most useful form. No storage of intermediate results is required.

Obviously many modifications and variations of the present invention are possible in view of the above teachings. It is therefore to be understood that within the scope of the appended claims the invention may be practiced otherwise than as specifically described.

What is claimed is:

1. A tolerance computer for providing a tolerance condition signal indicating whether first and second binary signals have a difference within a predetermined degree of tolerance represented by a third binary signal comprising:

first binary subtractor means for receiving and subtracting the first and second binary signals and providing a fourth binary signal indicative of the difference between the first and second signals; and comparer means for receiving the third and said fourth signals and generating fifth and sixth binary signals representing the difference and the sum of said fourth and the third signals, said comparer means including means responsive to said fifth and sixth signals for providing tolerance condition signal.

2. A computer according to claim 1 wherein said comparer means comprises:

complementer means for serially receiving the third signal and providing a seventh binary signal in serial form indicative of the two's complement of the third signal;

second binary subtractor means for serially receiving and subtracting said fourth and the third signals and providing said fifth signal in serial form indicative of the difference;

third binary subtractor means for serially receiving and subtracting said fourth and seventh signals for providing said sixth signal in serial form synchronized with said fifth signal and indicative of the difference between said signals received; and EXCLUSIVE OR gate means for serially receiving said fifth and sixth signals and providing the tolerance condition signal.

3. A computer according to claim 2 wherein said comparer means further comprises:

monitor means connected to said EXCLUSIVE OR gate means and being responsive to a timing control signal for passing a valid portion of the tolerance condition signal during the last bit time of said fifth and sixth signals.

4. A computer according to claim 1 wherein said comparer means comprises:

second binary subtractor means for serially receiving said fourth and the third signals and providing said fifth signal in serial form indicative of the difference;

binary adder means for serially receiving said fourth and the third signals and providing said sixth signal in serial form synchronized with said fifth signal and indicative of the sum of said fourth and the third signals; and EXCLUSIVE OR gate means for serially receiving said fifth and sixth signals and providing the tolerance condition signal.

5. A computer according to claim 4 wherein said comparer means further comprises:

monitor means connected to said EXCLUSIVE OR gate means and being responsive to a timing conrol signal for passing a valid portion of the tolerance condition signal during the last bit time of said fifth and sixth signals.

6. A computer according to claim 1 wherein said comparer comprises:

monitoring means for serially receiving the tolerance condition signal and responsive to a control signal for passing the tolerance condition signal associated with the most significant digit of said fifth and sixth signals.

7. A computer according to claim 6 further comprising:

timing control means providing a series of shift signals the last of which being said control signal applied to said monitoring means; and tolerance number source means for providing the third signal and being responsive to said series of shift signals from said timing control means for shifting out said third signal in serial form to said comparer means.

8. A computer according to claim 7 wherein said timing control means provides a series of flip-flop toggle signals each lagging in phase behind a respective one of said shift signals, and said first binary subtractor means comprises:

a first EXCLUSIVE OR gate connected to serially receive the first and second signals and providing a seventh signal in serial form;

first inverter means for receiving the second signal and for providing the NOT form of the second signal;

first and second AND gates each connected to receive said seventh signal and each connected to receive a respective one of the second signal and said NOT form of said second signal for providing AND gate output signals;

first flip-flop means connected to said first and second AND gates for providing a first flip-flop output signal and being responsive to said toggle signals both for being set by said first AND gate output signal and for being reset by said second AND gate output signal; and a second EXCLUSIVE OR gate connected to receive a first flip-flop output signal and said seventh signal for providing said fourth signal.

9. A computer according to claim 8 wherein said comparer means comprises:

a third EXCLUSIVE OR gate connected to serially receive the third and said fourth signals and providing an eighth signal in serial form;

second inverter means for receiving said third signal and for providing the NOT form of said third signal;

third and fourth AND gates each connected to receive said eighth signal and each connected to receive a respective one of said third signal and said NOT form of said third signal for providing AND gate output signals;

second flip-flop means connected to said third and fourth AND gates for providing a second flip-flop output signal and being responsive to said toggle signals both for being set by said third AND gate output signal and for being reset by said fourth AND gate output signal;

a fourth EXCLUSIVE OR gate connected to receive said second flip-flop output signal and said eighth signal for providing said fifth signal;

binary adder means connected to receive and add said third and fourth signals for providing said sixth signal; and a fifth EXCLUSIVE OR gate connected to receive said fifth and sixth signals for providing the tolerance condition signal to said monitor means.

10. A computer according to claim 9 wherein said binary adder means comprises;

third inverter means connected to said third EXCLUSIVE OR gate for providing the NOT form of said eighth signal;

fifth and sixth AND gate means for providing AND gate output signals, each being connected to receive said NOT form of said eighth signal, one being connected to receive said third signal and the other being connected to receive said NOT form of said third signal;

third flip-flop means connected to said fifth and sixth AND gates for providing a third flip-flop output signal and being responsive to said toggle signal for being set by said fifth AND gate output signal and being reset by said sixth AND gate output signal; and a sixth EXCLUSIVE OR gate connected to receive said third flip-flop output signal and said eighth signal for providing said sixth signal to said fifth EXCLUSIVE OR gate.

References Cited

FOREIGN PATENTS 1,278,733 11/1961 France.

EUGENE G. BOTZ, Primary Examiner

R. S. DILDINE, Jr., Assistant Examiner

U.S. Cl. X.R.

235—164, 168, 176; 340—146.2